(12) United States Patent
Mizuguchi

(10) Patent No.: US 11,192,740 B2
(45) Date of Patent: Dec. 7, 2021

(54) SHEET CONVEYING APPARATUS AND IMAGE FORMING APPARATUS

(71) Applicant: CANON KABUSHIKI KAISHA, Tokyo (JP)

(72) Inventor: Kohei Mizuguchi, Joso (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/983,564

(22) Filed: May 18, 2018

(65) Prior Publication Data

US 2018/0339872 A1 Nov. 29, 2018

(30) Foreign Application Priority Data

May 29, 2017 (JP) .............................. JP2017-105922

(51) Int. Cl.
*B65H 29/70* (2006.01)
*B65H 29/52* (2006.01)
(Continued)

(52) U.S. Cl.
CPC ................ *B65H 5/36* (2013.01); *B65H 5/062* (2013.01); *B65H 5/26* (2013.01); *B65H 9/00* (2013.01);
(Continued)

(58) Field of Classification Search
CPC .......... B65H 29/70; B65H 29/52; B65H 5/36; B65H 5/38; B65H 29/58; B65H 29/60;
(Continued)

(56) References Cited

U.S. PATENT DOCUMENTS 5,194,904 A * 3/1993 Ruch ...................... B65H 29/52
162/269
5,775,685 A 7/1998 Yamaoka et al.
(Continued)

FOREIGN PATENT DOCUMENTS

CN 1085848 A 4/1994
CN 1167274 A 12/1997
(Continued)

OTHER PUBLICATIONS

U.S. Appl. No. 15/832,895, Kohei Mizuguchi, filed Dec. 6, 2017.
(Continued)

*Primary Examiner* — Luis A Gonzalez
(74) *Attorney, Agent, or Firm* — Venable LLP

(57) ABSTRACT

A sheet conveying apparatus includes a sheet conveying member; a guide portion configured to define a sheet conveying path; a pressing portion configured to press the sheet to curve the sheet as viewed in a sheet conveying direction in the sheet conveying path; and a moving portion movable by an edge of the sheet passing through the sheet conveying path and arranged so that at least a part of a movable range of the moving portion is overlapped with the pressing portion. The moving portion includes a first abutment portion configured to abut against the sheet passing through the sheet conveying path on one side in the width direction with respect to a conveyance center of the sheet conveying member and a second abutment portion configured to abut against the sheet passing through the sheet conveying path on the other side with respect to the conveyance center.

20 Claims, 6 Drawing Sheets

(51) Int. Cl.

| | | |
|---|---|---|
| *B65H 5/36* | (2006.01) | |
| *H04N 1/00* | (2006.01) | |
| *B65H 5/06* | (2006.01) | |
| *B65H 9/00* | (2006.01) | |
| *B65H 5/26* | (2006.01) | |
| *B65H 29/12* | (2006.01) | |
| *B65H 29/14* | (2006.01) | |
| *B65H 43/08* | (2006.01) | |

(52) U.S. Cl.
CPC ........... *B65H 29/125* (2013.01); *B65H 29/14* (2013.01); *B65H 29/70* (2013.01); *B65H 43/08* (2013.01); *H04N 1/0066* (2013.01); *H04N 1/00618* (2013.01); *B65H 2301/33312* (2013.01); *B65H 2301/51214* (2013.01); *B65H 2404/1521* (2013.01); *B65H 2404/611* (2013.01); *B65H 2511/51* (2013.01); *B65H 2553/612* (2013.01); *B65H 2801/06* (2013.01); *H04N 1/00702* (2013.01)

(58) Field of Classification Search
CPC .... B65H 2301/33312; B65H 2553/612; B65H 2301/5122; B65H 5/062; B65H 5/26; B65H 9/00; G03G 15/6576; G03G 15/6573; H04N 1/00618; H04N 1/0066; H04N 1/00702
See application file for complete search history.

(56) References Cited

U.S. PATENT DOCUMENTS

| 6,318,714 | B1 | 11/2001 | Beskitt et al. | |
|---|---|---|---|---|
| 6,789,794 | B2 | 9/2004 | Miyazawa | |
| 7,063,472 | B2 | 6/2006 | Matsuda et al. | |
| 8,910,938 | B2* | 12/2014 | Sunohara | B65H 43/02 |
| | | | | 271/258.01 |
| 9,463,947 | B2* | 10/2016 | Tahara | B65H 29/70 |
| 9,592,992 | B2 | 3/2017 | Mizuguchi et al. | |
| 9,670,027 | B2 | 6/2017 | Yokobori | |
| 9,772,594 | B2* | 9/2017 | Hamada | G03G 15/6576 |
| 9,896,291 | B2 | 2/2018 | Sugiyama | |
| 9,950,885 | B2 | 4/2018 | Mizuguchi | |
| 2007/0002089 | A1* | 1/2007 | Kobayashi | B41J 11/003 |
| | | | | 347/16 |
| 2017/0248888 | A1* | 8/2017 | Izumichi | G03G 15/5062 |
| 2018/0170701 | A1* | 6/2018 | Mizuguchi | B65H 9/004 |

FOREIGN PATENT DOCUMENTS

| CN | 1397478 | A | | 2/2003 |
|---|---|---|---|---|
| CN | 1403880 | A | | 3/2003 |
| CN | 105388723 | A | | 3/2016 |
| EP | 1 084 974 | A2 | | 3/2001 |
| JP | 01122851 | A | * | 5/1989 |
| JP | 01-267252 | A | | 10/1989 |
| JP | 05043110 | A | * | 2/1993 |
| JP | 07-76140 | A | | 3/1995 |
| JP | 2000-313530 | A | | 11/2000 |
| JP | 2012111564 | A | * | 6/2012 |
| JP | 2016-137999 | A | | 8/2016 |
| JP | 2017081686 | A | * | 5/2017 |
| WO | 99/28223 | A1 | | 6/1999 |

OTHER PUBLICATIONS

Office Action dated Mar. 2, 2020, in Chinese Patent Application No. 201810518520.X.

Office Action dated Apr. 20, 2021, in Japanese Patent Application No. 2017-105922.

* cited by examiner

SHEET CONVEYING APPARATUS AND IMAGE FORMING APPARATUS

BACKGROUND OF THE INVENTION

Field of the Invention

The present invention relates to a sheet conveying apparatus configured to convey a sheet, and an image forming apparatus including the sheet conveying apparatus.

Description of the Related Art

A sheet conveying apparatus, which is used in an image forming apparatus such as a printer, a copying machine, a facsimile machine, or a multifunction peripheral having those functions, includes, in many cases, a detector configured to detect a position of a sheet. In Japanese Patent Application Laid-Open No. H07-76140, there is described a configuration in which switch levers are arranged at a plurality of positions in a width direction of the sheet, and a detection switch detects that the switch levers are pressed and turned by the sheet passing through a sheet conveying path.

Further, as a sheet conveying apparatus, there is given a sheet conveying apparatus including a pressing member configured to press a sheet conveyed by a sheet conveying member such as a conveying roller pair so as to curve the sheet in a thickness direction of the sheet to increase the rigidity of the sheet. For example, in a sheet conveying apparatus configured to discharge a sheet to an outside of an image forming apparatus, there has been known a configuration that prevents the sheet from hanging down during a discharge operation by curving the sheet by the pressing member so as to enhance the capability to stack sheets on a discharge tray or the like.

In this case, it is conceivable that the switch levers described in Japanese Patent Application Laid-Open No. H07-76140 and the pressing member configured to press the sheet are provided in the same sheet conveying apparatus. However, when the switch levers and the pressing member are arranged at different positions in a conveying direction of the sheet, it is required that a conveyance route of the sheet have enough length for securing a space for arranging those members, which may hinder downsizing of the sheet conveying apparatus. Meanwhile, when the switch levers are arranged on lateral sides of the pressing member in the width direction of the sheet, there is a risk in that skew feed of the sheet is caused by resistance forces applied by the switch levers to the sheet.

SUMMARY OF THE INVENTION

In view of the above-mentioned circumstances, the present invention provides a sheet conveying apparatus, which attains downsizing of the apparatus, and is configured to prevent skew feed of a sheet.

According to one embodiment of the present invention, there is provided a sheet conveying apparatus, comprising:
 a sheet conveying member configured to convey a sheet;
 a guide portion configured to define a sheet conveying path through which the sheet conveyed by the sheet conveying member passes;
 a pressing portion configured to press the sheet conveyed by the sheet conveying member in a thickness direction of the sheet so as to curve the sheet as viewed in a sheet conveying direction in the sheet conveying path;
 a moving portion movable by an edge of the sheet passing through the sheet conveying path in the sheet conveying direction abutting against the moving portion, the moving portion being arranged so that at least a part of a movable range of the moving portion is overlapped with the pressing portion as viewed in a width direction orthogonal to the sheet conveying direction; and
 a detector configured to detect a movement of the moving portion,
 wherein the moving portion includes:
  a first abutment portion configured to abut against the sheet passing through the sheet conveying path on one side in the width direction with respect to a conveyance center of the sheet conveying member in the width direction; and
  a second abutment portion configured to abut against the sheet passing through the sheet conveying path on another side in the width direction with respect to the conveyance center.

Further features of the present invention will become apparent from the following description of exemplary embodiments with reference to the attached drawings.

DESCRIPTION OF THE EMBODIMENTS

The embodiments will be described in accordance with the accompanying drawings.

Figure 1:
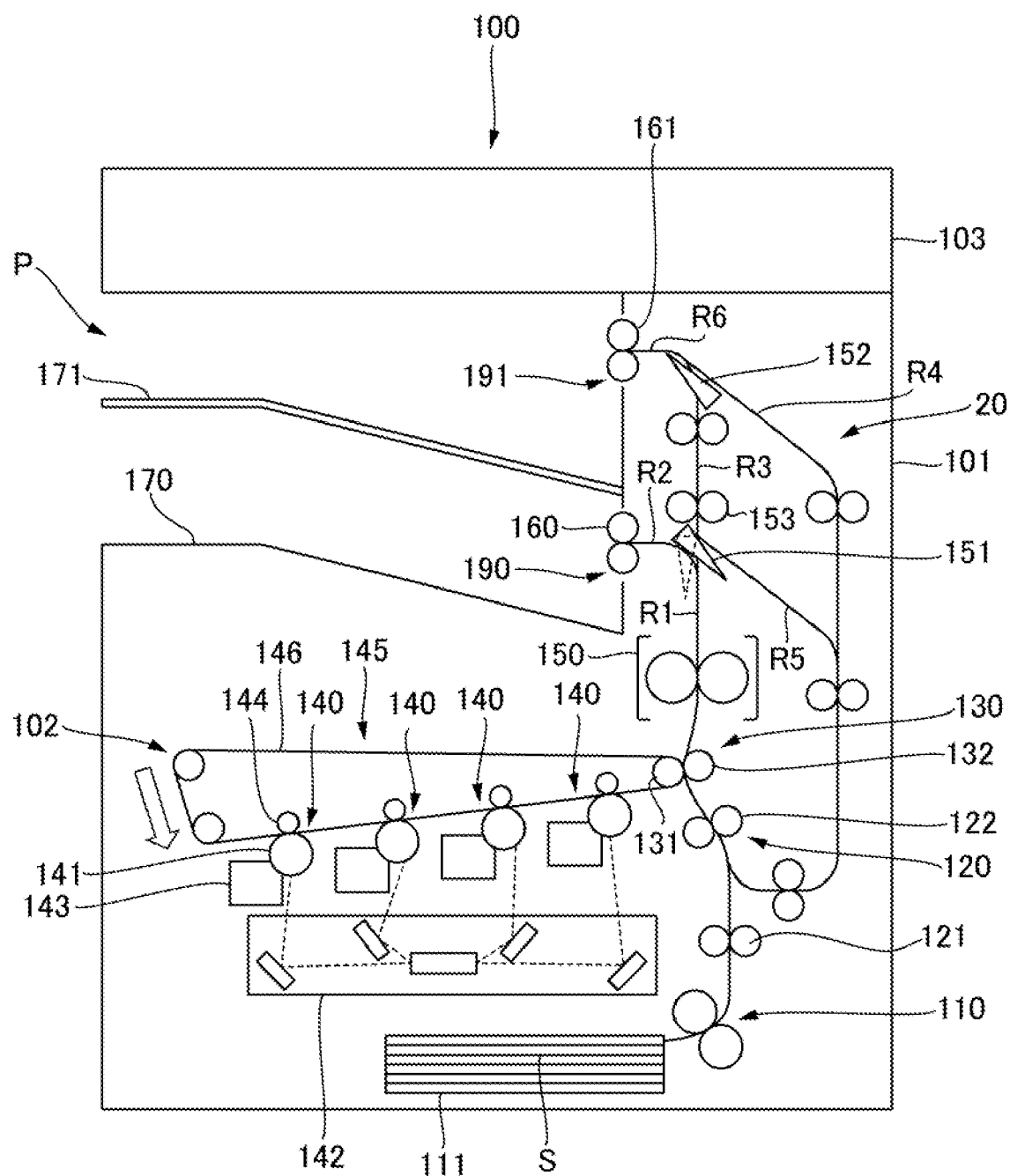
FIG. 1 is a schematic view for illustrating a configuration of an image forming apparatus according to the present disclosure.

Now, a description will be provided of an image forming apparatus according to the present disclosure with reference to the drawings. As illustrated in FIG. 1, the image forming apparatus according to the present disclosure is a full-color laser beam printer (hereinafter referred to as "printer") 100 including an electrophotographic image forming portion 102. The printer 100 is configured to form an image on a sheet S based on image information input from an external PC or image information read from an original. The sheet S refers to a recording medium including paper such as a paper sheet or an envelope, a plastic film such as a sheet for an overhead projector (OHP), and a cloth.

The printer 100 includes a printer main body 101 and an image reading apparatus 103. The printer main body 101 is an image forming apparatus main body. The image reading apparatus 103 is installed substantially horizontally above the printer main body 101. A discharge space P for discharging a sheet is formed between the image reading apparatus 103 and the printer main body 101.

The image forming portion 102 includes a scanner unit 142, four process cartridges 140, and an intermediate transfer unit 145 arranged above the process cartridges 140. The process cartridges 140 each include a photosensitive drum 141 being a photosensitive member and a developing device 143, and are configured to form toner images of yellow, magenta, cyan, and black by an electrophotographic process. That is, in each of the process cartridges 140, laser light is radiated onto the photosensitive drum 141 charged in advance by the scanner unit 142 so that the photosensitive drum 141 is exposed to light, to thereby form an electrostatic latent image. Then, the electrostatic latent image is developed with toner supplied from a developing device 143.

The intermediate transfer unit 145 includes, as an intermediate transfer member, an intermediate transfer belt 146 stretched over a secondary transfer inner roller 131 and other rollers. Further, the intermediate transfer unit 145 includes primary transfer rollers 144. The primary transfer rollers 144 are provided on an inner side of the intermediate transfer belt 146, and are held in abutment against the intermediate transfer belt 146 at positions opposed to the photosensitive drums 141. The intermediate transfer belt 146 is arranged so as to be held in contact with the photosensitive drums 141, and is driven by a drive unit (not shown) to rotate in a direction of rotation in association with the photosensitive drums 141 (counterclockwise direction in FIG. 1). Bias voltages are applied to the primary transfer rollers 144, and the toner images formed on the photosensitive drums 141 of the process cartridges 140 are primarily transferred onto the intermediate transfer belt 146 so as to be superimposed on one another. With this, a full-color image is formed on a surface of the intermediate transfer belt 146.

A secondary transfer roller 132 is provided at a position opposed to the secondary transfer inner roller 131 of the intermediate transfer unit 145, and forms a secondary transfer portion 130 together with the intermediate transfer belt 146. A bias voltage is applied to the secondary transfer roller 132, and the full-color image borne by the intermediate transfer belt 146 is secondarily transferred onto the sheet S. A fixing device 150 is arranged above the secondary transfer roller 132. The fixing device 150 includes a fixing roller pair and a heat source such as a heater. The fixing roller pair is configured to nip and convey the sheet S. The heat source is configured to heat the fixing roller pair. The fixing device 150 is configured to fix the toner images onto the sheet S by applying heat and pressure to toner particles.

Simultaneously with such an image forming operation, the printer 100 performs a feeding operation of feeding the sheet S to the image forming portion 102 by a sheet feeding portion 110 provided in a lower portion of the printer main body 101. The sheets S fed from the feeding cassette 111 one by one are conveyed to a skew-feed correcting device 120 by the conveying roller pair 121, and skew feed of the sheet S is corrected by the skew-feed correcting device 120. The skew-feed correcting device 120 includes a roller pair 122 that is capable of nipping and conveying the sheet S, and feeds the sheet S in synchronization with a timing at which the toner images borne by the intermediate transfer belt 146 arrive at the secondary transfer portion 130. The sheet S, having the toner images transferred thereonto at the secondary transfer portion 130 and fixed by the fixing device 150 is fed to a post-fixing path R1 extending upward from the fixing device 150.

The printer 100 includes, as stacking portions on which the sheets S are stacked, a first discharge tray 170 and a second discharge tray 171. The first discharge tray 170 is provided on an upper portion of the printer main body 101. The second discharge tray 171 protrudes into the discharge space P from the printer main body 101, and is located above the first discharge tray 170. Further, in the printer main body 101, there are provided a first discharge portion 190 and a second discharge portion 191. The first sheet discharge portion 190 is configured to discharge the sheet S to the first discharge tray 170. The second sheet discharge portion 191 is configured to discharge the sheet S to the second discharge tray 171. The sheet S fed to the post-fixing path R1 is guided by a first flap 151, which is positioned above the fixing device 150, to any one of a first discharge path R2 leading to the first sheet discharge portion 190 and a second discharge path R3 leading to the second sheet discharge portion 191.

Specifically, when the first discharge tray 170 is designated as a discharge destination of the sheet S in setting information of a command for causing the printer 100 to perform the image forming operation (print job), the first flap 151 guides the sheet S to the first discharge path R2. The sheet S guided to the first discharge path R2 is discharged from the printer main body 101 by the first discharge roller pair 160, and is stacked on the first discharge tray 170. When the second discharge tray 171 is designated as a discharge destination of the sheet S, the first flap 151 guides the sheet S to the second discharge path R3. The sheet S guided to a second discharge portion 191 by a second flap 152 positioned above the first flap 151 is discharged from the printer main body 101 by the second discharge roller pair 161, and is stacked on the second discharge tray 171.

Further, when duplex printing is designated as setting information of the print job, the first flap 151 guides the sheet S toward the second discharge path R3 irrespective of an ultimate discharge destination of the sheet. Second discharge roller pairs 161 are each a reverse roller pair that is rotatable in a forward direction and a reverse direction, and, in the case of the duplex printing, are capable of performing switchback conveyance of switching a conveying direction of the sheet S received from a second flap 152 and feeding back the sheet S to a reversing and conveying portion 20. When the switchback conveyance is performed, the second flap 152 guides the sheet S passing through the second discharge path R3 toward the second discharge roller pairs 161, and then, guides the sheet S reversed in moving direction to a reverse path R4 of the reversing and conveying portion 20. That is, the second flap 152 can be switched between a first posture for guiding the sheet S from the second discharge path R3 toward the second discharge roller pairs 161 and a second posture for guiding the sheet S conveyed by the switchback conveyance to the reverse path R4. The first flap 151 and the second flap 152 are each an example of a switching member capable of switching the conveyance route of the sheet between a first conveyance route and a second conveyance route.

The reversing and conveying portion 20 conveys the sheet S downward, and passes the sheet S to the skew-feed correcting device 120 under a state in which a surface having an image already formed thereon (front surface) and a surface opposite thereto (back surface) are reversed. The skew-feed correcting device 120 corrects skew feed of the sheet S again, and feeds the sheet S to the secondary transfer portion 130 in synchronization with a timing of the operation of the image forming portion 102. Then, the sheets S having toner images transferred onto the back surface thereof and fixed thereon by the fixing device 150 are discharged through a route selected by the first flap 151 to the first discharge tray 170 or the second discharge tray 171 as the ultimate discharge destination.

A conveying roller pair 153 being a reverse roller pair is arranged in the second discharge path R3, and, in a case of performing duplex printing on a sheet having a small size such as a postcard size, a setting of performing switchback conveyance by the conveying roller pair 153 can be selected. The sheet reversed by the conveying roller pair 153 is passed to the reversing and conveying portion 20 through a path R5 below the reverse path R4, and the image is formed on the back surface by the image forming portion 102.

The above-mentioned first sheet discharge portion 190 and the above-mentioned second sheet discharge portion 191 are each an example of a sheet conveying apparatus configured to convey the sheet. Those discharge portions each include a pressing portion and a detection mechanism. The pressing portion prevents the sheet from hanging down at the time of discharging the sheet and at the time of performing switchback conveyance, to thereby enhance the stability of the sheet conveying operation. The detection mechanism is capable of detecting the sheet passing through a sheet conveying path. In the following, a configuration effective for downsizing of the sheet conveying apparatus and prevention of skew feed of the sheet is described by taking the second sheet discharge portion 191 as an example.

First Embodiment

Figure 2:
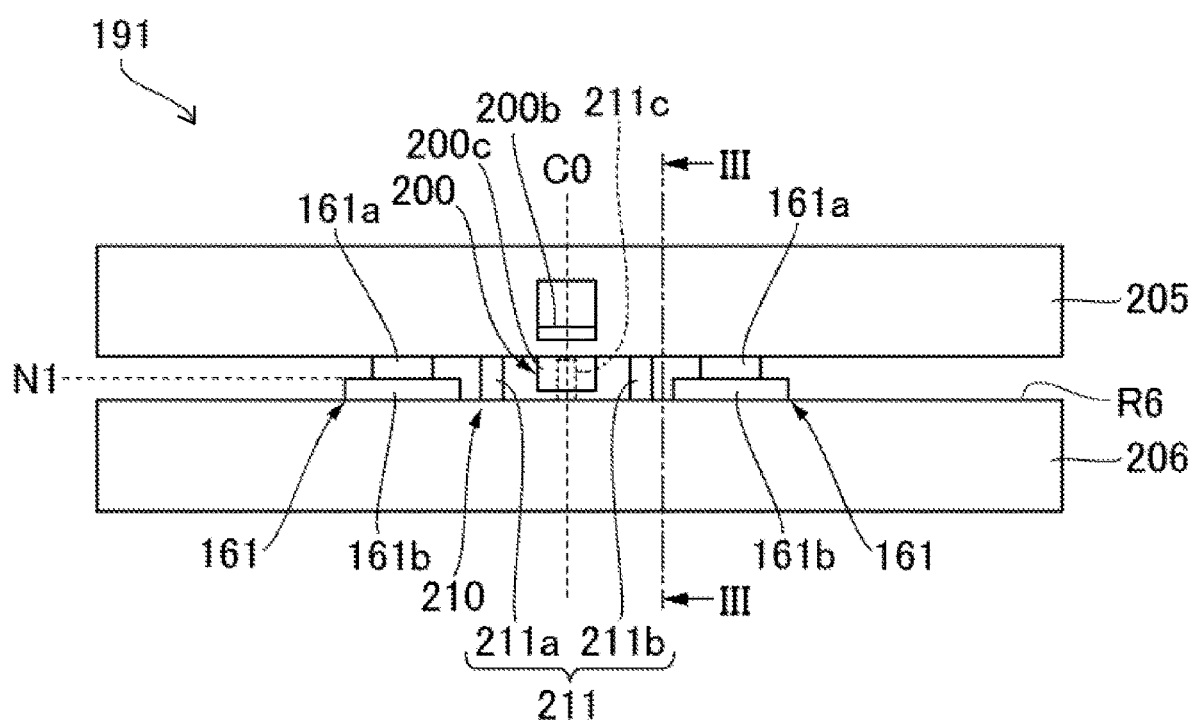
FIG. 2 is a schematic view of a sheet discharge portion of a first embodiment of the present invention as viewed in a sheet conveying direction.
Figure 3:
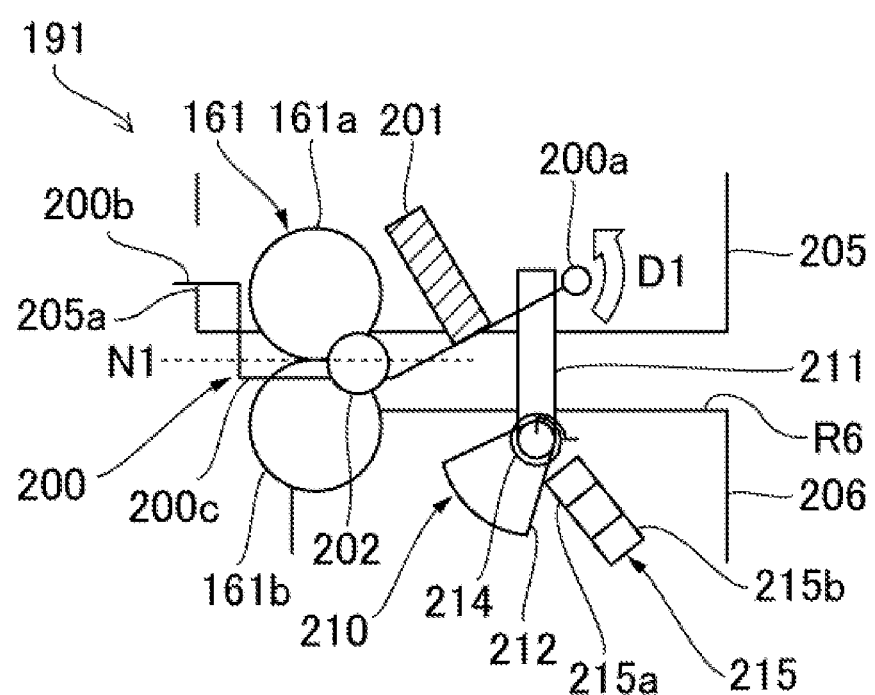
FIG. 3 is a sectional view of the sheet discharge portion of the first embodiment.
Figure 4:
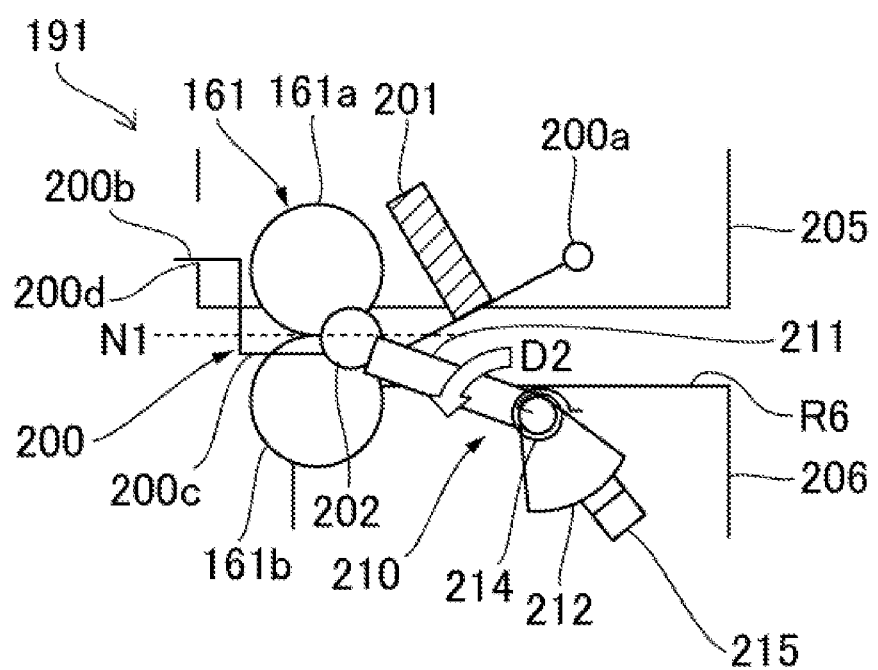
FIG. 4 is a sectional view of the sheet discharge portion of the first embodiment, and is an explanatory view for illustrating an operation of a sensor flag.
Figure 5:
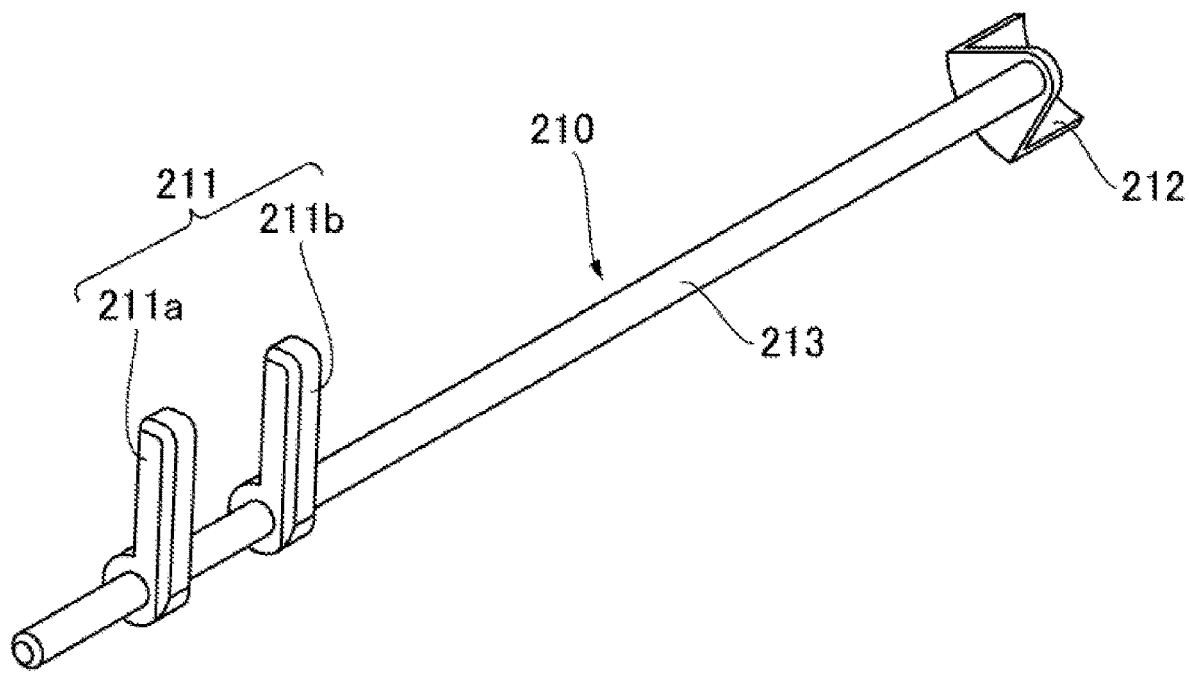
FIG. 5 is a perspective view of the sensor flag in the first embodiment.

First, a description will be provided of a configuration of the second sheet discharge portion 191 (hereinafter simply referred to as "sheet discharge portion") of a first embodiment of the present invention with reference to FIG. 2 to FIG. 5. FIG. 2 is a schematic view of the sheet discharge portion 191 as viewed from an outer side of the printer main body, that is, the left side in FIG. 1. FIG. 3 and FIG. 4 are sectional views of the sheet discharge portion 191 at a position illustrated in FIG. 2. FIG. 5 is a perspective view of a sensor flag 210 arranged in the sheet discharge portion 191.

As illustrated in FIG. 2, the sheet discharge portion 191 includes the second discharge roller pairs 161 (hereinafter simply referred to as "discharge roller pairs"), and the upper guide 205 and the lower guide 206 being guide portions defining a sheet conveying path R6. The discharge roller pairs 161 are arranged at a plurality of positions in a width direction of the sheet, that is, a direction orthogonal to the sheet conveying direction, and each include a driving roller 161a and a driven roller 161b. The driving roller 161a is driven by a drive source such as a motor. The driven roller 161b is rotated in conjunction with the driving roller 161a. The sheet conveying direction refers to a direction in which the sheet is moved along the sheet conveying path R6 when the discharge roller pairs 161 are rotated in the forward direction and the reverse direction. The discharge roller pairs 161 each correspond to a sheet conveying member configured to convey the sheet. The upper guide 205 corresponds to a first guide opposed to a first surface of the sheet, and the lower guide 206 corresponds to a second guide opposed to a second surface of the sheet.

Further, as illustrated in FIG. 2 and FIG. 3, the sheet discharge portion 191 includes a pressing member 200, a sensor flag 210, and a sensor 215. The pressing member 200 is configured to press the sheet in the thickness direction so as to curve the sheet. The sensor flag 210 is configured to move by being brought into abutment against the edge of the sheet. The sensor 215 is capable of detecting movement of the sensor flag 210. The pressing member 200 is an example of the pressing portion. The sensor flag 210 is an example of a moving portion. The sensor 215 is an example of a detector capable of detecting movement of the moving portion.

The pressing member 200 includes an arm 200c, a pressing roller 202, and a pressing spring 201. The arm 200c is supported on the upper guide 205 so as to be turnable about a shaft portion 200a. The pressing roller 202 is supported on the arm 200c so as to be rotatable. The pressing spring 201 is configured to urge the pressing roller 202 downward. An end 200b of the arm 200c is engaged with a positioning portion 205a being an opening portion formed in the upper guide 205, and is movable in a direction of approaching the lower guide 206 and separating from the lower guide 206 within a range regulated by the positioning portion 205a. The pressing spring 201 being an urging member urges the arm 200c in a direction indicated by the arrow D1, that is, urges the arm 200c so as to press the pressing roller 202 onto the upper surface of the sheet passing through the sheet conveying path R6.

When the sheet discharge portion 191 does not convey the sheet, the arm 200c is positioned under a state in which the end 200b is held in abutment against the positioning portion 205a by an urging force of the pressing spring 201. At this time, a part of each of the pressing roller 202 and the arm 200c is retained at a position protruding downward with respect to a nip portion N1 of the discharge roller pair 161. When the sheet passes through the sheet conveying path R6, the pressing roller 202 and the arm 200c press the sheet downward to curve the sheet so that the sheet protrudes downward between the two discharge roller pairs 161 and 161 as viewed in the sheet conveying direction (see FIG. 2).

With this, the bending rigidity of the sheet is increased, and the portion of the sheet, which protrudes to the outside of the printer main body, is prevented from hanging down in the case in which the discharge roller pairs 161 discharge the sheet and the case in which the discharge roller pairs 161 perform switchback conveyance. Consequently, behavior of the sheet is stabilized. That is, it is possible to reduce a risk in that the sheet hangs down to degrade the alignment of the sheet bundle stacked on the second discharge tray 171 during discharge of the sheet. Further, it is possible to reduce a risk in that the sheet hangs down to cause slippage of the discharge roller pairs 161 during switchback conveyance.

The lower end of the pressing member 200 includes the pressing roller 202 being a rotary member. Thus, the pressing roller 202 is rotated in association with the sheet, thereby suppressing the resistance applied by the pressing member 200 to the sheet. Further, a pressing force by the pressing member 200 with respect to the sheet is determined by the pressing spring 201. Thus, as the rigidity of the sheet is increased, the arm 200c retreats upward, and curve of the sheet, which is formed by the pressing member 200, is reduced. Therefore, the pressing member 200 presses the sheet having high rigidity with a large force, thereby being capable of avoiding damage such as rubbing marks.

The sensor flag 210 and the sensor 215 form the detection mechanism capable of detecting the sheet passing through the sheet conveying path R6. As illustrated in FIG. 3 and FIG. 4, the sensor flag 210 being an example of the moving portion includes an abutment portion 211 capable of being brought into abutment against the sheet passing through the sheet conveying path R6, and is supported by the lower guide 206 so as to be turnable. The sensor flag 210 is movable between a first position (FIG. 3) at which the abutment portion 211 blocks the sheet conveying path R6 as viewed in the width direction and a second position (FIG. 4) at which the abutment portion 211 is pressed by the sheet to be turned in a direction indicated by the arrow D2 so that the sensor flag 210 retreats downward from the first position. Further, the sensor flag 210 is urged toward the first position by a flag spring 214 interposed between the lower guide 206 and the sensor flag 210.

The sensor 215 is a photointerrupter, and light from the sensor 215 is blocked by a light blocking portion 212 provided on the sensor flag 210. As illustrated in FIG. 3, when the sensor flag 210 is located at the first position, light emitted from a light emitting portion 215a of the sensor 215 is detected by a light receiving portion 215b of the sensor 215. In contrast, as illustrated in FIG. 4, when the sensor flag 210 is moved to the second position, light emitted from the light emitting portion 215a is blocked by the light blocking portion 212. Therefore, a control unit mounted in the printer main body is capable of detecting, based on a detection signal from the sensor 215, that the edge of the sheet reaches the detection position by the sensor 215, that is, a position of being brought into abutment against the sensor flag 210 located at the first position.

[Positional Relationship between Pressing Member and Sensor Flag]

The positional relationship between the pressing member 200 and the sensor flag 210 is described in detail. As illustrated in FIG. 3 and FIG. 4, the sensor flag 210 is arranged so as to be overlapped with the pressing member 200 as viewed in the width direction, that is, so that a movable range of the abutment portion 211 is overlapped with the pressing member 200.

As illustrated in FIG. 2, the pressing member 200 is arranged between the two discharge roller pairs 161 and 161 so as to be overlapped with a conveyance center C0 of the discharge roller pairs 161 and 161 in the width direction. The conveyance center is a reference position in a configuration of conveying a sheet so that a position of the sheet in the width direction, specifically, a center portion of the sheet in the width direction matches with a predetermined reference regardless of the sheet size (so-called center reference method). The conveyance center C0 in the first embodiment is a center position between the discharge roller pairs 161 and 161.

The abutment portion 211 of the sensor flag 210 is arranged on one side and another side with respect to the conveyance center in the width direction. That is, the abutment portion 211 includes a first abutment portion 211a and a second abutment portion 211b. The first abutment portion 211a is arranged on one side of the pressing member 200 in the width direction. The second abutment portion 211b is arranged on another side of the pressing member 200 in the width direction. The first abutment portion 211a and the second abutment portion 211b are arranged so as to be symmetrical to each other with respect to the conveyance center C0 in the width direction, and are positioned between the pressing member 200 and the discharge roller pairs 161 and 161 in the width direction. That is, the first abutment portion 211a, the second abutment portion 211b, and the pressing member 200 are arranged between the first roller pair (161) and the second roller pair (161) adjacent to each other with the conveyance center C0 therebetween in the width direction.

As illustrated in FIG. 5, the first abutment portion 211a and the second abutment portion 211b are mounted to a flag shaft 213 being a shaft member, and the light blocking portion 212 capable of blocking detection light from the sensor 215 is mounted to an end of the flag shaft 213. Therefore, when the sheet is brought into abutment against the first abutment portion 211a and the second abutment portion 211b, the entire sensor flag 210 including the first abutment portion 211a, the second abutment portion 211b, and the light blocking portion 212 is integrally turned about the shaft center of the flag shaft 213.

As described above, in the first embodiment, arrangement of the abutment portion 211 and the pressing member 200 in the width direction is offset so that at least a part of a movable range of the sensor flag 210 is overlapped with the pressing member 200 as viewed in the width direction. Therefore, as compared to a case in which the pressing member 200 and the sensor flag 210 are arranged at different positions in the sheet conveying direction, downsizing of the apparatus in the sheet conveying direction can be achieved. In particular, the sheet conveying path R6 in the first embodiment is a conveying path which connects the second flap 152 and the discharge roller pairs 161 to each other and is used for switchback conveyance. Therefore, in order to adapt to various sheet sizes, it is preferred that the sheet conveying path R6 be short. In such a configuration, it is suitable that the sensor flag 210 and the pressing member 200 be arranged so as to be overlapped with each other as viewed in the width direction.

Further, in the first embodiment, the first abutment portion 211a is arranged on the one side with respect to the conveyance center C0 in the width direction, and the second abutment portion 211b is arranged on the other side with respect to the conveyance center C0 in the width direction. Therefore, in a process in which the sheet passing through the sheet conveying path R6 is brought into abutment against the abutment portion 211 to turn the sensor flag 210 so that the sheet slides on the abutment portion 211, the resistance forces acting on the sheet are canceled out between the one side and the other side with respect to the conveyance center C0. That is, in the configuration in which the sensor flag 210 and the pressing member 200 are overlapped with each other in the width direction, a risk of causing skew feed of the sheet due to the resistance forces applied by the sensor flag 210 to the sheet can be reduced. With this, the downsizing of the apparatus and the prevention of skew feed of the sheet can both be attained.

It is suitable that the first abutment portion 211a and the second abutment portion 211b be arranged so as to be symmetrical to each other with respect to the conveyance center C0 in the width direction as in the first embodiment. With this, it can be expected that the resistance forces applied to the sheet by the first abutment portion 211a and the second abutment portion 211b are equalized between the one side and the other side with respect to the conveyance center C0 more precisely. In particular, the discharge portion of the first embodiment has a function of, in the case of performing the duplex printing, performing the switchback conveyance of the sheet, and feeding the sheet toward the image forming portion 102 again (see FIG. 1). Therefore, a risk of causing inclination and misalignment of the image formed on the back surface is reduced, thereby contributing to improvement in quality of the image.

Further, in the first embodiment, the pressing member 200 is arranged between the two discharge roller pairs 161 and 161 as viewed in the sheet conveying direction, and the first abutment portion 211a and the second abutment portion 211b are arranged between the pressing member 200 and the discharge roller pairs 161 and 161. Therefore, even in a case of a sheet having a small size such as a postcard size, a conveyance timing of the sheet can reliably be detected using the sensor flag 210.

Further, in the first embodiment, the pressing member 200 protrudes from the same side as the upper guide 205 (upper side) with respect to the sheet conveying path R6, and the sensor 215 is arranged on the same side as the lower guide 206 (lower side) with respect to the sheet conveying path R6. With this configuration, the configuration in which the sensor flag 210 and the pressing member 200 are overlapped with each other as viewed in the width direction can easily be attained. Further, the pressing member 200 is brought into abutment against the surface on the side opposite to the surface on which the image is formed by the image forming portion 102 (upper surface of the sheet in the sheet conveying path R6) immediately before the passage of the sheet. With this configuration, occurrence of an image failure such as rubbing marks by the pressing member 200 can be avoided. For example, when the sensor 215 is arranged in the upper guide 205, it is conceivable that a configuration for avoiding an interference between the pressing member 200 and the sensor flag 210, such as a configuration in which the flag shaft 213 is formed into a shape of circumventing the pressing member 200, and an arrangement space therefore are additionally required.

According to the first embodiment, downsizing of the sheet conveying apparatus can be attained, and, in addition, skew feed of the sheet can be prevented.

[Modification Example]

In the configuration illustrated in the first embodiment, the pressing member 200 is arranged at the position of being overlapped with the conveyance center C0, and the first abutment portion 211a and the second abutment portion 211b are arranged on both sides of the pressing member 200. However, the arrangement and the number of the abutment portions and the pressing member may be changed. For example, there may be employed a configuration in which, as indicated by the broken line in FIG. 2, an abutment portion 211c of a sensor flag 210 is arranged at the position of being overlapped with the conveyance center C0, and a cutout is formed in the pressing member 200 or two pressing members are arranged on both sides with respect to the conveyance center C0. Further, there may be employed a configuration in which, in addition to the abutment portion 211c, the above-mentioned first abutment portion 211a and the above-mentioned second abutment portion 211b are arranged so that three abutment portions are arranged so as to be symmetrical to each other with respect to the conveyance center C0. Further, a plurality of pressing members 200 may be arranged. For example, there may be employed a configuration in which the pressing member is arranged on each of outer sides of the two discharge roller pairs 161 and 161 in the width direction so that a curved shape of the sheet is determined by a total of three pressing members.

In short, it is only required that the moving portion such as a sensor flag and the pressing portion are arranged so as to be at least partially overlapped with each other as viewed in the width direction, and that resistance forces applied by the abutment portions of the moving portion to the sheet are equalized as much as possible between the one side and the other side with respect to the conveyance center in the width direction. It is only required that the pressing portion be provided at least at one position in the width direction, and it is preferred that at least one pressing portion be arranged on the conveyance center, or at a plurality of positions of being symmetrical to each other with respect to the conveyance center.

The above-mentioned pressing member 200 is an example of the pressing portion capable of curving the sheet by pressing the sheet. For example, there may be employed a configuration in which the arm 200c itself presses the sheet without providing the pressing roller 202. The pressing portion is not limited to a member that is pivotable like the above-mentioned pressing member 200, and may be a member fixed to the upper guide 205 or the like. Further, the above-mentioned discharge roller pairs 161 are each a reverse roller pair capable of performing the switchback conveyance of the sheet, and each also serve as a discharge member capable of discharging the sheet to the second discharge tray 171. However, a sheet conveying member that performs any one of switchback conveyance and discharge may be employed. Further, the sensor 215 is an example of the detector. In place of a photointerrupter, a photoelectronic sensor such as a photo reflector may be employed as the sensor 215, or a contact type switch may be used as the sensor 215.

Second Embodiment

Figure 6:
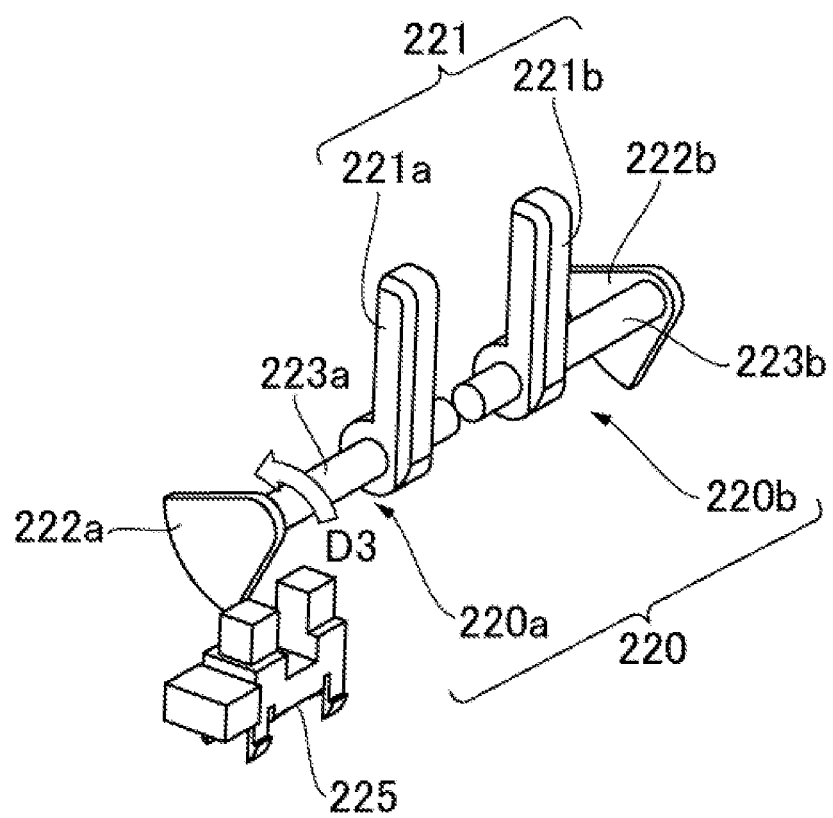
FIG. 6 is a perspective view of a sensor flag and a sensor in a second embodiment of the present invention.

Next, a description will be provided of a configuration of a sheet discharge portion of a second embodiment of the present invention with reference to FIG. 6. The sheet discharge portion according to the second embodiment is different from the above-mentioned first embodiment in the configuration of the detection mechanism configured to detect the sheet passing through the sheet conveying path. Other components common to those of the first embodiment are denoted by the same reference symbols, and description thereof is omitted.

Similarly to the sensor flag 210 in the above-mentioned first embodiment, a sensor flag 220 illustrated in FIG. 6 is movable between a first position at which an abutment portion 221 blocks the sheet conveying path R6 and a second position at which the abutment portion 221 retreats downward from the first position. That is, the sensor flag 220 is another example of the moving portion. The sensor flag 220 of the second embodiment includes a first flag 220a and a second flag 220b that are turnable independently of each other.

The first flag 220a includes a first shaft portion 223a being a first shaft member, and a first abutment portion 221a and a first light blocking portion 222a mounted to the first shaft portion 223a. Further, the second flag 220b includes a second shaft portion 223b being a second shaft member arranged on the same axis as the first shaft portion 223a, and a second abutment portion 221b and a second light blocking portion 222b mounted to the second shaft portion 223b. Both the first shaft portion 223a and the second shaft portion 223b are supported by the lower guide 206 so as to be turnable. Further, the first flag 220a and the second flag 220b are each connected to a flag spring, and are urged toward the first position.

Arrangement of the first abutment portion 221a and the second abutment portion 221b in the width direction is the same as that of the first abutment portion 211a and the second abutment portion 211b in the first embodiment. That is, the first abutment portion 221a and the second abutment portion 221b are arranged on both sides of the pressing member 200 in the width direction at positions of being symmetrical to each other with respect to the conveyance center C0. Further, the first flag 220a and the second flag 220b are arranged so that a movable range of the first abutment portion 221a and a movable range of the second abutment portion 221b are overlapped with the pressing member 200 as viewed in the width direction.

A sensor 225 being a detector corresponds to at least one of the first flag 220a and the second flag 220b, and at least one sensor 225 is arranged. The first flag 220a and the second flag 220a receive equal urging forces from the two flag springs. When the edge of the sheet is brought into abutment against the abutment portion of any one of the flags so that the flag is moved to the second position, another flag is simultaneously moved to the second position. Therefore, in the illustrated example, the sensor 225 is arranged only for the first flag 220a. The sensor 225 is a photointerrupter, and light from the sensor 225 is blocked by the first light blocking portion 222a when the first flag 220a is turned in a direction indicated by the arrow D3.

In short, it is only required that the moving portion such as a sensor flag and the pressing portion are arranged so as to be at least partially overlapped with each other as viewed in the width direction, and that resistance forces applied by the abutment portions of the moving portion to the sheet are equalized as much as possible between the one side and the other side with respect to the conveyance center in the width direction. It is only required that the pressing portion be provided at least at one position in the width direction, and it is preferred that at least one pressing portion be arranged on the conveyance center, or at a plurality of positions of being symmetrical to each other with respect to the conveyance center.

Other Embodiments

The above-mentioned sheet discharge portion (second discharge portion) 191 is an example of the sheet conveying apparatus, and this technology may be applied to a sheet conveying apparatus used in other portions of the image forming apparatus. For example, the configuration of the first embodiment or the second embodiment is applicable to the first sheet discharge portion 190. Further, as image forming apparatus, there may be given, in addition to an apparatus main body including an image former, an image reading apparatus configured to read an image by automatically feeding a sheet being an original, and auxiliary devices such as a sheet processing apparatus configured to subject a sheet output from the apparatus main body to a process such as a binding process. This technology may be applied to a sheet conveying apparatus configured to convey a sheet in such auxiliary devices.

The printer 100 is an example of the image forming apparatus, and may be replaced by a copying machine, a facsimile machine, or a multifunction peripheral. Further, the above-mentioned electrophotographic image forming portion 102 is an example of an image former, and an image forming portion of an ink-jet type or an electrophotographic unit of a direct-transfer type may be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-105922, filed May 29, 2017, which is hereby incorporated by reference herein in its entirety.

What is claimed is:

1. A sheet conveying apparatus comprising:
    a conveying portion configured to convey a sheet;
    a guide portion configured to define a sheet conveying path through which the sheet conveyed by the conveying portion passes;
    a sheet discharging member arranged downstream of the conveying portion with respect to a sheet conveying direction and configured to discharge the sheet;
    a pressing portion arranged on a center of the sheet conveying path in a sheet width direction orthogonal to the sheet conveying direction and configured to press the sheet conveyed by the sheet discharging member in a thickness direction of the sheet so as to curve the sheet as viewed in the sheet conveying direction in the sheet conveying path;
    a moving portion movable by an edge of the sheet conveyed toward the sheet discharging member in the sheet conveying direction by the conveying portion, the edge of the sheet abutting against the moving portion before the edge arrives at the sheet discharging member, the moving portion being arranged so that a part of a movable range of the moving portion is overlapped with the pressing portion as viewed in the sheet width direction; and
    a detector configured to detect a movement of the moving portion,
    wherein the moving portion includes:
        a first abutment portion configured to abut against the sheet passing through the sheet conveying path on one side of the pressing portion with respect to the sheet width direction; and
        a second abutment portion configured to abut against the sheet passing through the sheet conveying path on another side of the pressing portion with respect to the sheet width direction.

2. A sheet conveying apparatus according to claim 1, wherein the first abutment portion and the second abutment portion are arranged symmetrically with respect to the center of the sheet conveying path in the sheet width direction.

3. A sheet conveying apparatus according to claim 1,
    wherein the sheet discharging roller pair member includes:
        a first nipping portion arranged on the one side in the sheet width direction with respect to the center of the sheet conveying path and configured to nip the sheet; and
        a second nipping portion arranged on the other side in the sheet width direction with respect to the center of the sheet conveying path and configured to nip the sheet, and
    wherein the pressing portion, the first abutment portion, and the second abutment portion are arranged between the first nipping portion and the second nipping portion in the sheet width direction.

4. A sheet conveying apparatus according to claim 1,
    wherein the guide portion includes:
        a first guide opposed to a first surface of the sheet; and
        a second guide configured to define the sheet conveying path between the first guide and the second guide and opposed to a second surface opposite to the first surface of the sheet,
    wherein the pressing member portion is arranged so as to protrude from a same side as the first guide with respect to the sheet conveying path toward the second guide, and
    wherein the detector is arranged on a same side as the second guide with respect to the sheet conveying path.

5. A sheet conveying apparatus according to claim 1, wherein the sheet discharging member comprises a roller rotatable in a first direction and in a second direction opposite to the first direction and configured to rotate in the first direction to convey the sheet received from the conveying portion and thereafter rotate in the second direction to convey the sheet.

6. A sheet conveying apparatus according to claim 1, wherein the sheet discharging member is configured to discharge the sheet to an outside of a main body of the sheet conveying apparatus.

7. A sheet conveying apparatus according to claim 1, wherein the moving portion includes a shaft member to which the first abutment portion and the second abutment portion are mounted, the shaft member being configured to rotate integrally with the first abutment portion and the second abutment portion.

8. A sheet conveying apparatus according to claim 1, wherein the moving portion includes:
   a first shaft member to which the first abutment portion is mounted; and
   a second shaft member to which the second abutment portion is mounted, the second shaft member being rotatable independently of the first shaft member, and
   wherein the detector detects a rotation of the first shaft member.

9. A sheet conveying apparatus according to claim 1, wherein the pressing portion includes:
   an arm supported to be pivotable with respect to the guide portion;
   a rotary member rotatably supported by the arm and rotatable in a state in which the rotary member abuts against the sheet; and
   an urging member configured to urge the arm so as to press the rotary member against the sheet passing through the sheet conveying path.

10. A sheet conveying apparatus according to claim 1, wherein the detector is a photointerrupter, and
   wherein the moving portion includes a light blocking portion configured to block detection light of the photointerrupter.

11. A sheet conveying apparatus according to claim 1, wherein the sheet discharging member includes a roller, and
   wherein the pressing portion overlaps with the roller as viewed in the sheet width direction.

12. An image forming apparatus comprising:
   a conveying portion configured to convey a sheet;
   a guide portion configured to define a sheet conveying path through which the sheet conveyed by the conveying portion passes;
   a sheet discharging member arranged downstream of the conveying portion with respect to a sheet conveying direction and configured to discharge the sheet;
   a pressing portion arranged on a center of the sheet conveying path in a sheet width direction orthogonal to the sheet conveying direction and configured to press the sheet conveyed by the sheet discharging member in a thickness direction of the sheet so as to curve the sheet as viewed in the sheet conveying direction in the sheet conveying path;
   a moving portion movable by an edge of the sheet conveyed toward the sheet discharging member in the sheet conveying direction by the conveying portion, the edge of the sheet abutting against the moving portion before the edge arrives at the sheet discharging member, the moving portion being arranged so that a part of a movable range of the moving portion is overlapped with the pressing portion as viewed in the sheet width direction;
   a detector configured to detect a movement of the moving portion; and
   an image former configured to form an image on the sheet conveyed by the conveying portion,
   wherein the moving portion includes:
      a first abutment portion configured to abut against the sheet passing through the sheet conveying path on one side of the pressing portion with respect to the sheet width direction; and
      a second abutment portion configured to abut against the sheet passing through the sheet conveying path on another side of pressing portion with respect to the sheet width direction.

13. A sheet conveying apparatus comprising:
   a conveying portion configured to convey a sheet;
   a guide portion configured to define a sheet conveying path through which the sheet conveyed by the conveying portion passes;
   a sheet discharging roller arranged downstream of the conveying portion with respect to a sheet conveying direction and configured to discharge the sheet;
   a pressing portion arranged on a center of the sheet conveying path in a sheet width direction orthogonal to the sheet conveying direction and configured to press the sheet conveyed by the sheet discharging roller in a thickness direction of the sheet so as to curve the sheet as viewed in the sheet conveying direction in the sheet conveying path;
   a moving portion movable relative to the pressing portion by the sheet being conveyed, the moving portion being arranged so that a part of a movable range of the moving portion is overlapped with the pressing portion as viewed in the sheet width direction and a part of the movable range of the moving portion is overlapped with the sheet discharging roller as viewed in the sheet width direction; and
   a detector configured to detect a movement of the moving portion,
   wherein the moving portion includes:
      a first abutment portion configured to abut against the sheet passing through the sheet conveying path on one side of the pressing portion with respect to the sheet width direction; and
      a second abutment portion configured to abut against the sheet passing through the sheet conveying path on another side of the pressing portion with respect to the sheet width direction.

14. A sheet conveying apparatus according to claim 13, wherein the first abutment portion and the second abutment portion are arranged symmetrically with respect to the center of the sheet conveying path in the sheet width direction.

15. A sheet conveying apparatus according to claim 13, further comprising another sheet discharging roller provided apart from the sheet discharging roller in the sheet width direction and configured to discharge the sheet,
   wherein the pressing portion, the first abutment portion, and the second abutment portion are arranged between the sheet discharging roller and the other sheet discharging roller in the sheet width direction.

16. A sheet conveying apparatus according to claim 13, wherein the guide portion includes:
   a first guide opposed to a first surface of the sheet; and
   a second guide configured to define the sheet conveying path between the first guide and the second guide and opposed to a second surface opposite to the first surface of the sheet,
   wherein the pressing portion is arranged so as to protrude from a same side as the first guide with respect to the sheet conveying path toward the second guide, and
   wherein the detector is arranged on a same side as the second guide with respect to the sheet conveying path.

17. A sheet conveying apparatus according to claim 13, wherein the sheet discharging roller is rotatable in a first direction and in a second direction opposite to the first direction and configured to rotate in the first direction to convey the sheet received from the conveying portion and thereafter rotate in the second direction to convey the sheet.

18. A sheet conveying apparatus according to claim 13, wherein the moving portion includes a shaft member to which the first abutment portion and the second abutment portion are mounted, the shaft member being configured to rotate integrally with the first abutment portion and the second abutment portion.

19. A sheet conveying apparatus according to claim 13, wherein the moving portion includes:
   a first shaft member to which the first abutment portion is mounted; and
   a second shaft member to which the second abutment portion is mounted, the second shaft member being rotatable independently of the first shaft member, and
   wherein the detector detects a rotation of the first shaft member.

20. A sheet conveying apparatus according to claim 13, wherein the pressing portion includes:
   an arm supported to be pivotable with respect to the guide portion;
   a rotary member rotatably supported by the arm and rotatable in a state in which the rotary member abuts against the sheet; and
   an urging member configured to urge the arm so as to press the rotary member against the sheet passing through the sheet conveying path.

* * * * *